(12) United States Patent
Lee et al.

(10) Patent No.: US 10,966,405 B2
(45) Date of Patent: Apr. 6, 2021

(54) ANIMAL BEDDING

(71) Applicant: LeapHigh Animals, LLC, Rancho Cucamonga, CA (US)

(72) Inventors: Si Hyung Lee, Chicago, IL (US); Sean Sangil Hahn, Rancho Cucamonga, CA (US)

(73) Assignee: Leaphigh Animals LLC, Las Vegas, NV (US)

(*) Notice: Subject to any disclaimer, the term of this patent is extended or adjusted under 35 U.S.C. 154(b) by 707 days.

(21) Appl. No.: 15/906,727

(22) Filed: Feb. 27, 2018

(65) Prior Publication Data
US 2020/0267929 A1    Aug. 27, 2020

(51) Int. Cl.
| A01K 1/035 | (2006.01) |
| A01K 1/015 | (2006.01) |
| B32B 7/08 | (2019.01) |
| B32B 5/02 | (2006.01) |
| B32B 27/12 | (2006.01) |

(52) U.S. Cl.
CPC ............ *A01K 1/0157* (2013.01); *B32B 5/024* (2013.01); *B32B 7/08* (2013.01); *B32B 27/12* (2013.01); *B32B 2250/03* (2013.01); *B32B 2255/02* (2013.01); *B32B 2255/26* (2013.01); *B32B 2307/728* (2013.01); *B32B 2307/73* (2013.01)

(58) Field of Classification Search
CPC .... A01K 1/0157; A01K 1/0353; B32B 5/024; B32B 7/08; B32B 7/12
USPC ....................................................... 119/28.5
See application file for complete search history.

(56) References Cited

U.S. PATENT DOCUMENTS

| 2,775,222 | A | * | 12/1956 | Eugenekruck | ....... A01K 1/0353 |
| | | | | | 119/482 |
| D219,743 | S | * | 1/1971 | Murray | ........................ D30/118 |
| 3,842,454 | A | * | 10/1974 | Young | .................... A47G 9/086 |
| | | | | | 5/413 R |
| 4,893,586 | A | * | 1/1990 | Carson | ................. A01K 1/0353 |
| | | | | | 119/482 |
| 5,010,843 | A | * | 4/1991 | Henry | .................. A01K 1/0353 |
| | | | | | 119/28.5 |
| 5,099,530 | A | * | 3/1992 | Scott | ........................ A47G 9/02 |
| | | | | | 5/419 |

(Continued)

OTHER PUBLICATIONS

Kelli's Crafts & More, https://www.etsy.com/shop/Kelliscraftsandmore (dated Jun. 9, 2016 from the wayback machine), Date Accessed: May 11, 2018.

(Continued)

*Primary Examiner* — Yvonne R Abbott-Lewis
(74) *Attorney, Agent, or Firm* — Lempia Summerfield Katz LLC

(57) ABSTRACT

Animal bedding, such as for a guinea pig, is disclosed. The animal bedding comprises a main section and a pocket. The main section includes a top layer, a middle layer and a bottom layer. The top layer is hydrophobic, the middle layer is hydrophilic and at least a part of the bottom layer is hydrophobic. The top layer, the middle layer and the bottom layer are attached to one another, such as via stitching along a perimeter of the main section. Separately, the top layer and the middle layer are attached to one another, such as in an interior of the main section, to form quilting in the main section. The pocket, which is attached to the main section, allows the guinea pig to burrow therein.

20 Claims, 16 Drawing Sheets

(56) References Cited

U.S. PATENT DOCUMENTS

| | | | | |
|---|---|---|---|---|
| 5,357,901 A * | 10/1994 | Batts | ............... | A01K 1/0353 |
| | | | | 119/28.5 |
| 5,630,376 A * | 5/1997 | Ochi | ............... | A01K 1/0107 |
| | | | | 119/169 |
| D390,686 S * | 2/1998 | Grabowski | ............... | 5/413 R |
| 5,749,314 A * | 5/1998 | Pelham | ............... | A01K 1/0353 |
| | | | | 119/28.5 |
| 6,173,675 B1 * | 1/2001 | Licciardo | ............... | A01K 1/0353 |
| | | | | 119/28.5 |
| 6,378,456 B1 * | 4/2002 | Jerome | ............... | A01K 1/0353 |
| | | | | 119/28.5 |
| D467,042 S * | 12/2002 | Peterson | ............... | D30/118 |
| D469,585 S * | 1/2003 | LaCroix | ............... | D30/118 |
| D523,192 S | 6/2006 | Northrop | | |
| D641,936 S | 7/2011 | Simpson | | |
| D744,263 S * | 12/2015 | Quinones | ............... | D6/603 |
| D765,922 S | 9/2016 | Savan | | |
| D799,759 S | 10/2017 | Elliott | | |
| D830,735 S | 10/2018 | Johnson | | |
| D831,898 S * | 10/2018 | Gerke | ............... | D30/118 |
| D869,880 S * | 12/2019 | Ruiz | ............... | D6/606 |
| D875,428 S | 2/2020 | Lin | | |
| D878,685 S | 3/2020 | Xu | | |
| 2014/0259405 A1 * | 9/2014 | Lacasse | ............... | A47G 9/0284 |
| | | | | 5/485 |
| 2018/0049400 A1 * | 2/2018 | Hills | ............... | A61D 9/00 |
| 2019/0014918 A1 * | 1/2019 | Markowitz | ............... | B32B 5/245 |
| 2019/0021277 A1 * | 1/2019 | Godfrey | ............... | A01K 1/0353 |
| 2019/0174892 A1 * | 6/2019 | Chen | ............... | B32B 5/18 |

OTHER PUBLICATIONS

Cozy and Clean, https://www.etsy.com/shop/CozyandClean (dated Aug. 23, 2017 from the wayback machine), Date Accessed: May 11, 2018.

Pradeep K. Kushwaha et al., "Studies on Water Absorption of Bamboo-Polyester Composites: Effect of Silane Treatment of Mercerized Bamboo", Instrument Design Development Center, Indian Institute of Technology Delhi, New Delhi, India; *Polymer-Plastics Technology and Engineering*, 49: pp. 45-52, 2010.

* cited by examiner

ANIMAL BEDDING

BACKGROUND

The domestic guinea pig are a common household pet. The guinea pig is docile by nature, friendly, and affectionate in response to handling and feeding. Care for the guinea pig typically includes a cage, such as a solid-bottom cage, and bedding added to the bottom of the cage. The bedding may include shredded paper, wood shavings, hay, or grass.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

Figure 1:
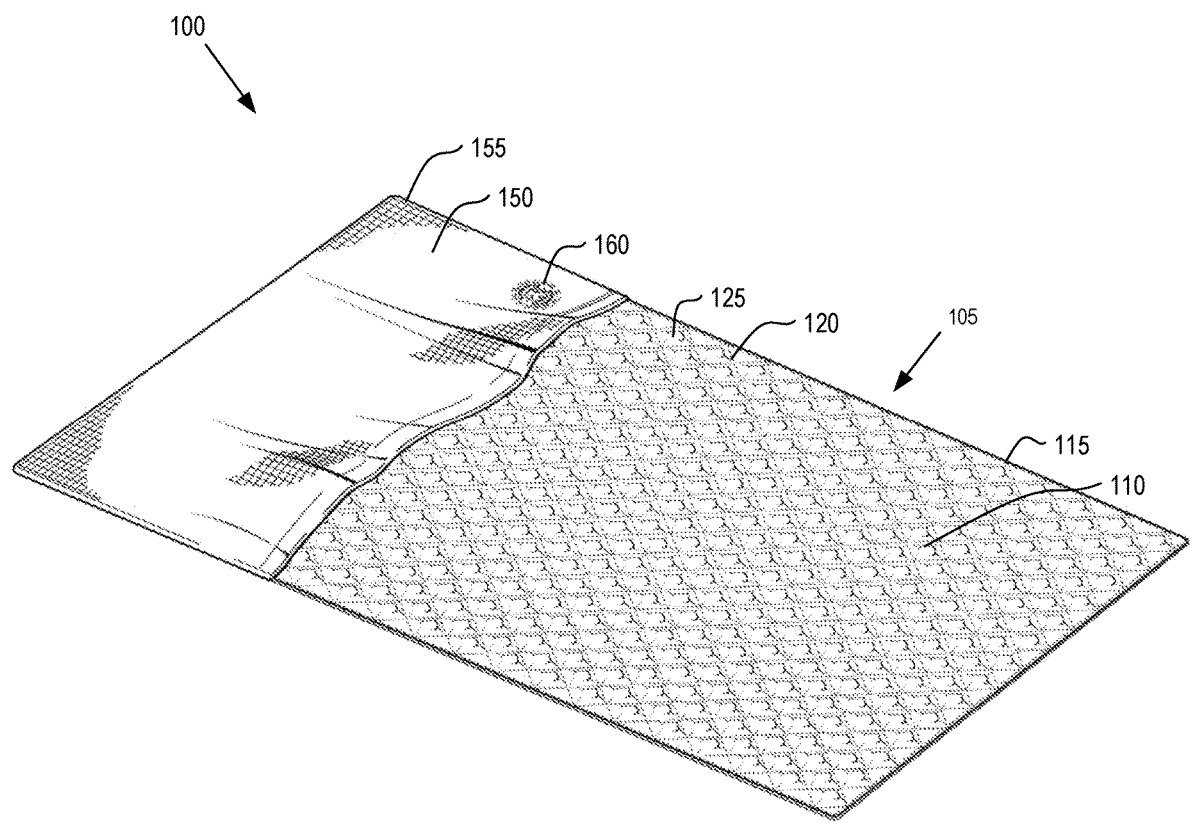
FIG. 1 is a front perspective view of the animal bedding.

Domesticated animals typically have some type of animal bedding. For example, guinea pigs typically thrive in an environment that has suitable bedding. However, typical guinea pig bedding suffers from several drawbacks. First, typical bedding, such as wood or shredded paper, results in the guinea pig living in the waste (e.g., urine and feces), leading to a potentially unhealthy situation. For example, the guinea pig may develop bumblefoot (i.e., pododermatitis) if the guinea pig's feet are exposed to its own waste in the wood or shredded paper. Second, wood or shredded paper results in a considerable amount of waste. Third, wood or shredded paper, needing to be replaced periodically, resulting in a big expense. Fourth, guinea pigs tend to jerk and leap into the air (typically term "popcorning"), resulting in waste/bedding being kicked out of the cage and into the household. Fifth, paper or wooded bedding may cause dust to be present in the environment. Since small animals, such as guinea pigs, are very close to the ground, the animals' noses may inhale the dust, causing respiratory-related diseases, such as URI (upper respiratory infection). As discussed further below, using fleece, which naturally does not have dust and has static properties to attract dust (which may be generated from hay, the guinea pigs' main source of food) from the environment, may reduce the dust exposure to the animals and, in turn, reduce incidence of respiratory-related diseases.

Various forms of animal bedding are envisioned. The below discussion focuses on guinea pig bedding. Nevertheless, any discussion regarding guinea pig bedding may be equally applied to other forms of animal bedding. In one implementation, the animal bedding includes a main section. In another implementation, the animal bedding includes a main section and a pocket. In a first specific implementation, the main section comprises three layers, including a top layer, a middle layer and a bottom layer. In a second specific implementation, the main section consists of the three layers.

The top layer may be made from a variety of materials. In one implementation, the top layer is composed of a material that is hydrophobic (e.g., tending to repel or fail to mix with water). In an alternate implementation, the top layer is composed of a material that is hydrophilic (e.g., tending to attract water). In still an alternate implementation, the top layer is composed of a blend of materials, with one material in the blend being hydrophilic and another material in the blend being hydrophobic (e.g., polyester/cotton blend). For example, one type of material for the top layer may comprise a synthetic fiber, such as a fabric woven or knitted from polyester (or other type of polymer) thread or yarn, a blend of polyester (or other type of polymer) with another material (e.g., cotton), or the like. One example material for the top layer is fleece, which may comprise a hydrophobic material. Fleece may come in different thicknesses, such as micro, 100, 200, and 300 grams per square meter (gsm), with 300 gsm being the thickest and least flexible and 100 gsm being less flexible. Further, fleece, may be made from polyester or other type of polymer. Alternatively, the top layer may comprise a plant-derived fiber, such as cotton or bamboo, which exhibit hydrophilic properties.

In one implementation, the middle layer may comprise a material that at least partly absorbs liquid (e.g., a hydrophilic material that attracts water). Specifically, the middle layer may comprise a material that is configured to break the liquid's surface tension so that the liquid moves into the spaces between fibers of the material, and into the fibers themselves. For example, the middle layer may comprise a cellulose-based material. Examples of cellulose-based materials include, but are not limited to: cotton; hemp; or bamboo. Other types of cellulose-based materials are contemplated. In the example of the middle layer being composed of bamboo, in one implementation, the middle layer may be entirely composed of bamboo. Alternatively, the middle layer may be composed of a bamboo blend (e.g., bamboo blended with polyester or other synthetic material). Various blends of bamboo may be used. In one implementation, the various blends of bamboo include: at least 30% bamboo and at most 70% of an alternate material (such as polyester or other synthetic fiber); at least 40% bamboo and at most 60% of an alternate material (such as polyester or other synthetic fiber); at least 60% bamboo and at most 40% of an alternate material (such as polyester or other synthetic fiber); at least 70% bamboo and at most 30% of an alternate material (such as polyester or other synthetic fiber); at least 75% bamboo and at most 25% of an alternate material (such as polyester or other synthetic fiber); at least 80% bamboo and at most 20% of an alternate material (such as polyester or other synthetic fiber); at least 85% bamboo and at most 15% of an alternate material (such as polyester or other synthetic fiber); at least 90% bamboo and at most 10% of an alternate material (such as polyester or other synthetic fiber); at least 95% bamboo and at most 5% of an alternate material (such as polyester or other synthetic fiber). In another implementation, the various blends of bamboo include: at least 30% bamboo and at most 70% of alternate materials (such as a blend of cotton fiber and polyester or other synthetic fiber); at least 40% bamboo and at most 60% of alternate materials (such as a blend of cotton fiber and polyester or other synthetic fiber); at least 60% bamboo and at most 40% of alternate materials (such as a blend of cotton fiber and polyester or other synthetic fiber); at least 70% bamboo and at most 30% of alternate materials (such as a blend of cotton fiber and polyester or other synthetic fiber); at least 75% bamboo and at most 25% of alternate materials (such as a blend of cotton fiber and polyester or other synthetic fiber); at least 80% bamboo and at most 20% of alternate material (such as a blend of cotton fiber and polyester or other synthetic fiber); at least 85% bamboo and at most 15% of alternate materials (such as a blend of cotton fiber and polyester or other synthetic fiber); at least 90% bamboo and at most 10% of alternate materials (such as a blend of cotton fiber and polyester or other synthetic fiber); at least 95% bamboo and at most 5% of alternate materials (such as a blend of cotton fiber and polyester or other synthetic fiber). Bamboo (or bamboo blends) exhibit good hydrophilic properties, thereby attracting water (or urine) from the animal. In still an alternate implementation, the middle layer may be composed entirely of cotton.

Thus, in one implementation, the middle layer may consist of a single material. As one example, the material may entirely consist of bamboo, as discussed above. As another example, the material may entirely consist of a synthetic material. One specific example of a synthetic material is a microfiber. Specifically, a microfiber is a synthetic fiber that is finer than one denier or decitex/thread, and may have a diameter of less than ten µm. Microfibers may be made from polyesters, polyamides (e.g., nylon, a para-aramid synthetic fiber (e.g., Kevlar®), a meta-aramid material (e.g., Nomex®), trogamide), or a conjugation of polyester, polyamide, and polypropylene.

In an alternate implementation, the middle layer may comprise a composite material (e.g., a blend of materials). As one example, the composite blend may comprise a cellulose fiber and a non-cellulose fiber (e.g., cellulose fibers and poly microfibers, such as bamboo blended with a synthetic fiber). As another example, the composite blend may comprise two or more types of cellulose fibers (e.g., bamboo/cotton blend). In one implementation, the bamboo may comprise bamboo pulp fiber.

In one implementation, at least a part of the bottom layer may be waterproof and/or at least partially water repelling (such as completely water repelling). For example, at least a part, such as one or more surfaces of the bottom layer, may be hydrophobic. The bottom layer may comprise a material with a plastic coating or laminate. The material may be composed of cotton, synthetic (e.g., polyester), or a cotton/synthetic blend (e.g., polyblend). The material may be coated or laminated with polyurethane laminate (PUL), commonly known as PUL Fabric. In one implementation, at least one side of the bottom layer has a laminate (such as PUL). In a first specific implementation, the side of the bottom layer closer to the middle layer is the side with the laminate. Specifically, when assembled, the laminate side of the bottom layer touches or contacts the middle layer, as discussed below. In a second specific implementation, the side of the bottom layer further from the middle layer is the side with the laminate. Specifically, when assembled, the laminate side of the bottom layer does not touch or contact the middle layer (and instead contacts the ground). In a third specific implementation, both sides of the bottom layer include the laminate. Thus, in one implementation, the bottom layer is composed of a material that is hydrophobic. In an alternate implementation, the bottom layer is composed of a material that is hydrophilic. In still an alternate implementation, the bottom layer is composed of a blend of materials, with one material in the blend being hydrophilic and another material in the blend being hydrophobic (e.g., polyester/cotton blend).

In this way, fluid, such as urine, may pass through the top layer and be absorbed in the middle layer. Further, the fluid that is in the middle layer may remain in the middle layer without passing through to the bottom layer (such as due to the laminate in the bottom layer).

In one implementation, the top layer, the middle layer and the bottom layer are attached to one another. In a specific implementation, the top layer, the middle layer and the bottom layer are stitched together along a perimeter, as described in more detail below.

In an alternate implementation, in addition to attaching the top layer, the middle layer and the bottom layer together, the top layer and middle layer (but not the bottom layer) are attached together separately. In a first specific implementation, the means of attachment of the top layer, the middle layer and the bottom layer is the same as the separate means of attachment of the top layer and the middle layer. For example, stitching may be used to attach the top layer, the middle layer and the bottom layer together, and stitching may also be used to separately attach the top layer and the middle layer. In a second specific implementation, the means of attachment of the top layer, the middle layer and the bottom layer is different than the separate means of attachment of the top layer and the middle layer.

As discussed above, the location for attachment of the top layer, middle layer, and bottom layer are different from the location for separate attachment for the top layer and middle layer. For example, the top layer, middle layer, and bottom layer may be attached along a periphery or perimeter of the main section, as discussed above, and the top layer and middle layer may be separately attached in an interior of the main section. Further, the separate attachment of the top layer and middle layer may be in a pattern. For example, the stitching that attaches the top layer and middle layer may create a diamond pattern, square pattern, or the like as viewed on the top layer.

The separate attachment of the top layer to the middle layer may result in quilting. Quilting may result in one or more benefits. First, the middle layer, such as the bamboo or bamboo blend, even if the material (e.g., the bamboo) in the middle layer loosens, the middle layer will not shift significantly due to the quilting. Second, the quilting may hold the top layer and middle layer together better. Third, hay (or other debris) stuck in the top layer material (e.g., in the fleece material of the top layer) may be more easily removed because of the quilting.

In one implementation, a pocket may be attached to the main section (e.g., attached to at least one side or one edge of the main section). For example, the pocket may be attached on three sides or three edges to the main section, with the fourth side or fourth edge of the pocket being used as an opening for the animal to enter/exit the pocket. As another example, the pocket may be attached on two sides or two edges to the main section (such as to only two sides or two edges that meet in a corner of the main section). As still another example, the pocket may be attached to only one side or one edge of the main section. Certain animals, such as guinea pigs, are prey animals. In the wild, guinea pigs spend time underground. The pocket allows the guinea pig to burrow therein, where it is considered safe and dark. In one manner of manufacture, the three layers are attached to one another to form the main section, and thereafter, the pocket is attached to the main section. The method of attachment (e.g., stitching) for the three layers to form the main section may be the same method of attachment (e.g., stitching) for attaching the pocket to the main section. For example, the three layers may be stitched along a periphery to form the main section. Likewise, the pocket may be stitched along at least a part of the same periphery (such on three sides of the pocket) in order to attach the pocket to the main section. Alternatively, the method of attachment for the three layers to form the main section may be different from the method of attachment for attaching the pocket to the main section. Further, when the pocket is attached to the main section, the pocket may abuts the top layer of the main section. Further, flipping back the pocket behind the main section results in the pocket abutting the bottom layer of the main section. In addition, in one implementation, the pocket may be constructed of the same material as the top layer. For example, the pocket may be constructed of a fleece material similar to the top layer.

Each fleece layer may include a softer side and a rougher side. Given this, the pocket may be formed such that only the softer side of the fleece material is exposed to the guinea pig. In one example, two fleece layers may be sewn together such that both sides of the pocket (e.g., the top side of the pocket (which the guinea pig touches when sitting on the pocket) and the underside of the pocket (which the guinea pig touches when burrowing in the pocket)) have the softer side of the fleece material exposed. Alternatively, a single fleece layer may be folded over such that both sides of the pocket have the softer side of the fleece material exposed. In contrast, the top layer may be constructed of one layer of fleece material, with the softer side of the fleece material abutting the pocket (and exposed to the guinea pig when the guinea pig is burrowing in the pocket or sitting on the main section) and the other side of the fleece material (e.g., the rougher side) abutting the middle layer (and therefore not exposed to the guinea pig). In still an alternate implementation, the pocket may be composed of 200-250 gsm fleece, whereas the top layer may be composed of 100-150 gsm fleece. Alternatively, the pocket may be composed of 200-300 gsm fleece, whereas the top layer may be composed of 100-150 gsm fleece. In this way, the top layer and the pocket may be formed of the same material; however, the configuration of the material for the pocket (e.g., such that two layers of fleece are used) may be different than the configuration of the top layer (e.g., such that a single layer of fleece is used).

Embodiments

Figure 2A:
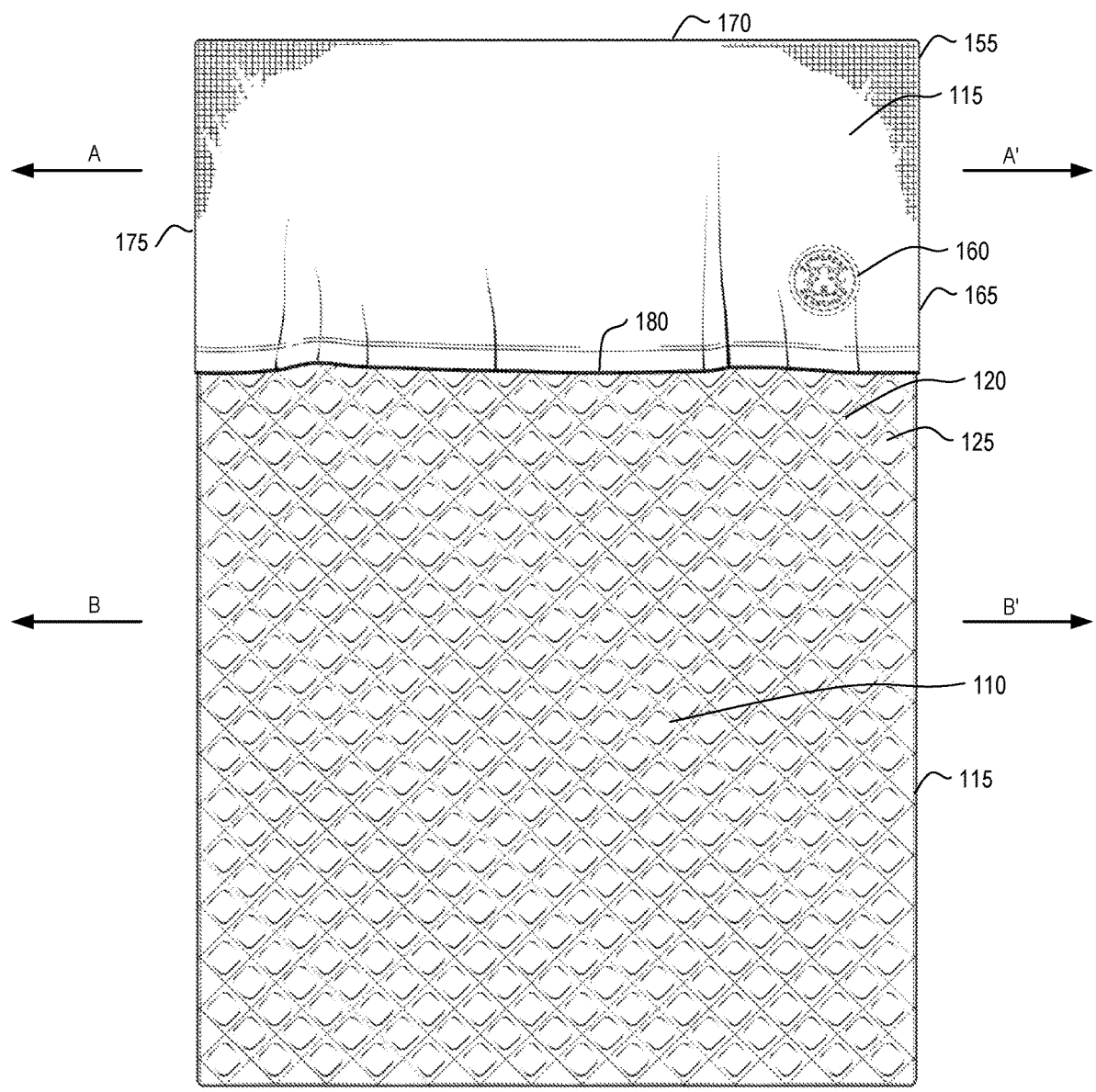
FIG. 2A is a front view of the animal bedding illustrated in FIG. 1.
Figure 9:
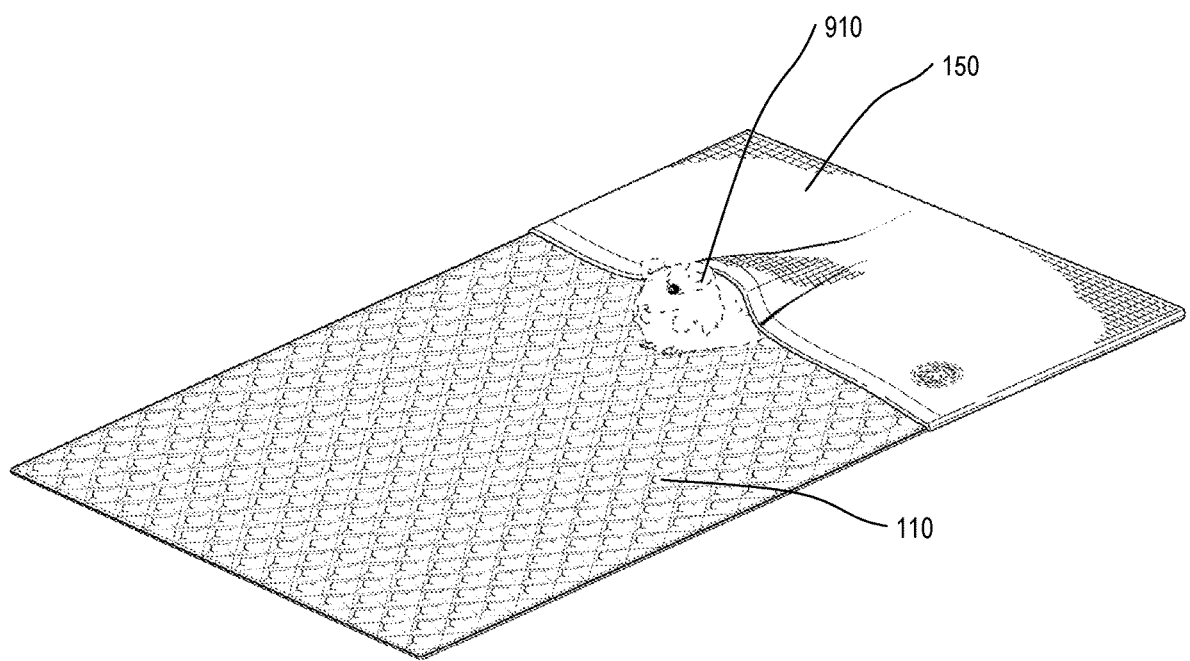
FIG. 9 is a front perspective side view of the animal bedding illustrated in FIG. 1 with a guinea pig shown.

Referring to the figures, FIG. 1 is a front perspective view of the animal bedding 100. FIG. 2A is a front view of the animal bedding illustrated in FIG. 1. The animal bedding 100 illustrated in FIG. 1 includes a main section 105 and a pocket 150. As discussed above, the pocket may be used by an animal to burrow therein. For example, FIG. 9 is a front perspective side view of the animal bedding illustrated in FIG. 1 with a guinea pig 910 shown within pocket 150. Alternatively, the animal bedding may consist of the main section 105 without the pocket 150.

Figure 8A:
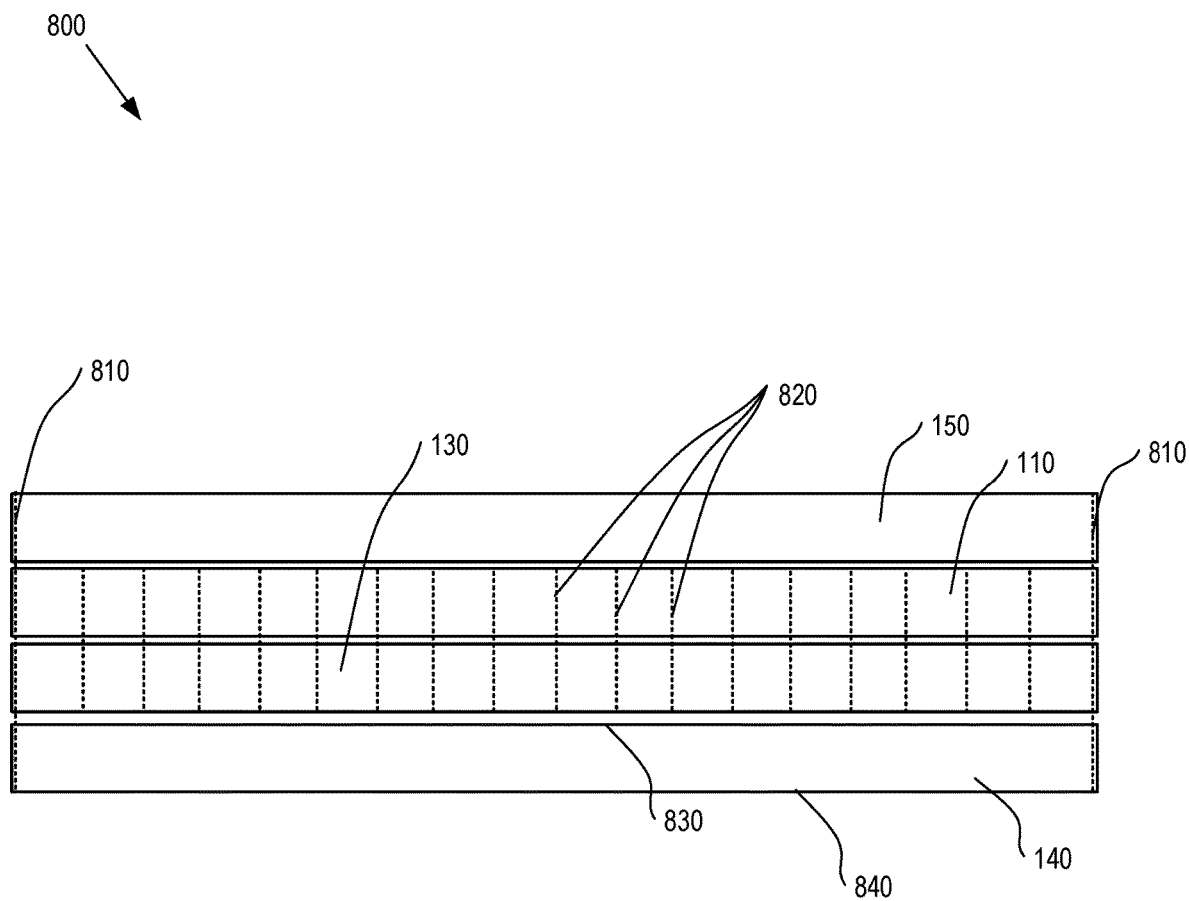
FIG. 8A is a cross-section at A-A' of FIG. 2A.
Figure 8B:
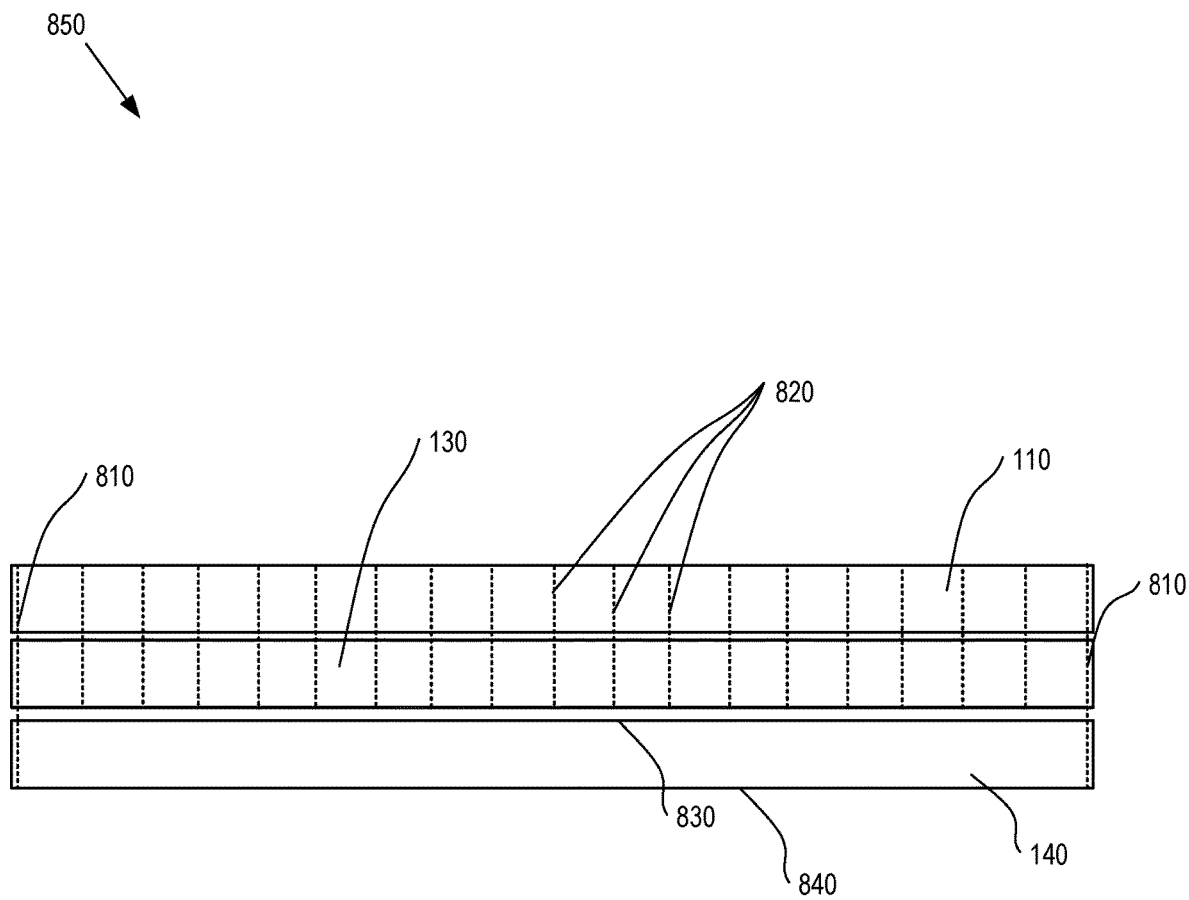
FIG. 8B is a cross-section at B-B' of FIG. 2A.

Main section 105 includes a top layer 110, a middle layer 130, and a bottom layer 140. Though not illustrated in FIG. 1, the middle layer is shown in FIGS. 8A-B. Further, the bottom layer is illustrated in FIGS. 3A-B and 8A-B. As discussed above, the top layer 110 may be made from a variety of materials, such as hydrophobic materials. Example materials include synthetic fibers (e.g., fleece) or synthetic blends. Likewise, the middle layer 130 may be may be made from a variety of materials, such as hydrophilic materials. Example materials include cellulose-based materials, such as bamboo or bamboo blends. The bottom layer 140 likewise may be made from a variety of materials, such as materials, with at least part of which are waterproof and/or water repelling. For example, the bottom layer may be composed of a fabric. In one implementation, the fabric for the bottom layer may be composed of cotton, synthetic (e.g., polyester), or a cotton/synthetic blend (e.g., polyblend), with a plastic coating or laminate applied to a side facing the middle layer, as discussed further below.

The top layer 110, middle layer 130, and bottom layer 140 may be connected or attached together in one of several ways. In one way, stitching may connect the top layer 110, middle layer 130, and bottom layer 140 together. For example, FIGS. 1 and 2A illustrate stitching 115 around an entire perimeter of main section 105. Alternatively, stitching may be less than the entire perimeter. Further, separate from attaching the top layer 110, middle layer 130, and bottom layer 140 together, at least two of the components of the main section (but not the third component of the main section) may be connected together as well. For example, top layer 110 and middle layer 130 (but not bottom layer 140) may be connected separately. For example, stitching 120 may connect top layer 110 and middle layer 130, as illustrated in FIGS. 1 and 2A. Stitching 120 may be in an interior of main section 105, such as interior to the perimeter of main section. In this regard, stitching 120 (connecting top layer 110 and middle layer 130) is in a different part of main section 105 than stitching 115 (connecting top layer 110, middle layer 130, and bottom layer 140). Further, stitching 120 results in quilting 125 or bunching of the middle layer 130.

Figure 2B:
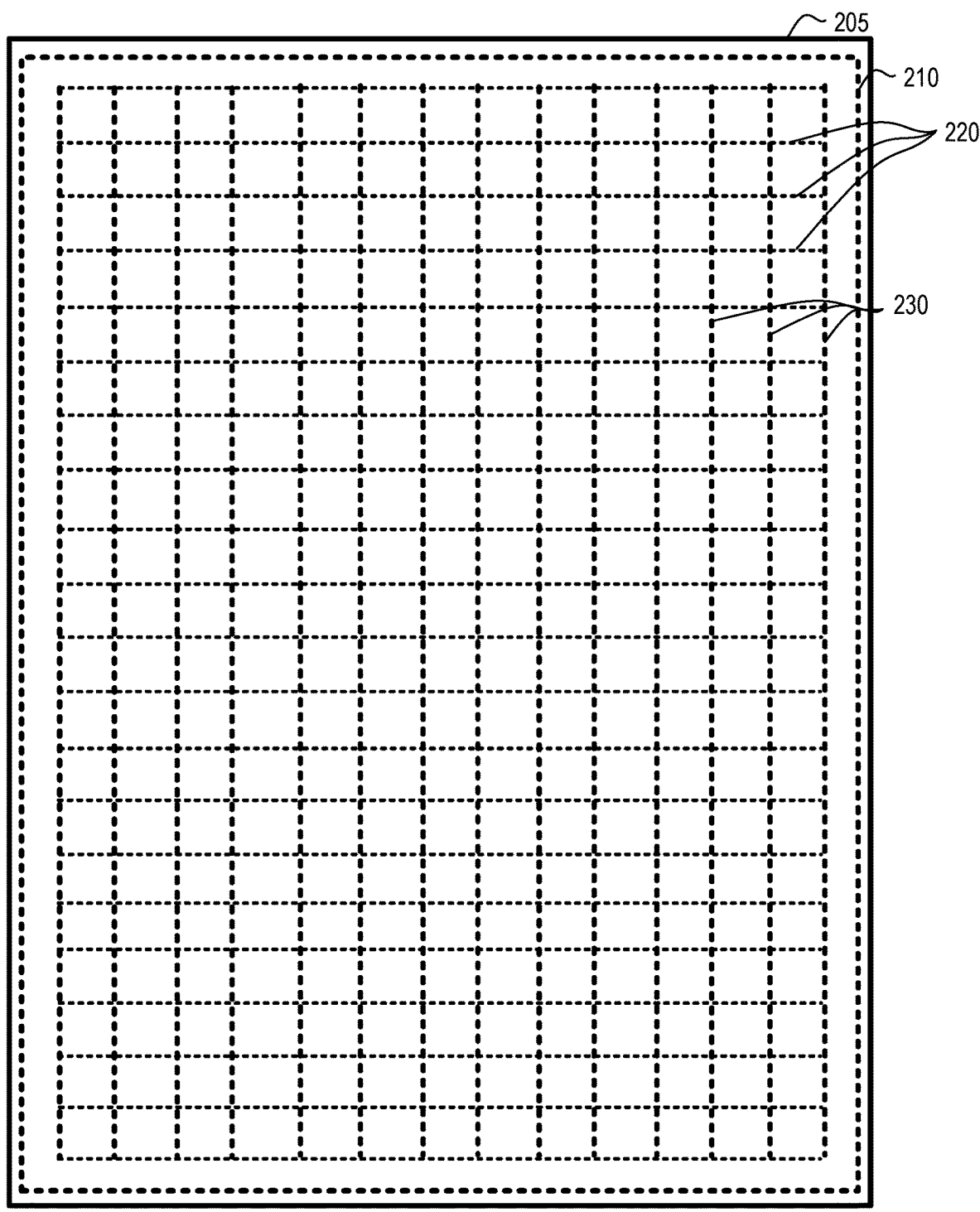
FIG. 2B is an alternate front view of the animal bedding comprising the main section with the pocket absent.
Figure 10:
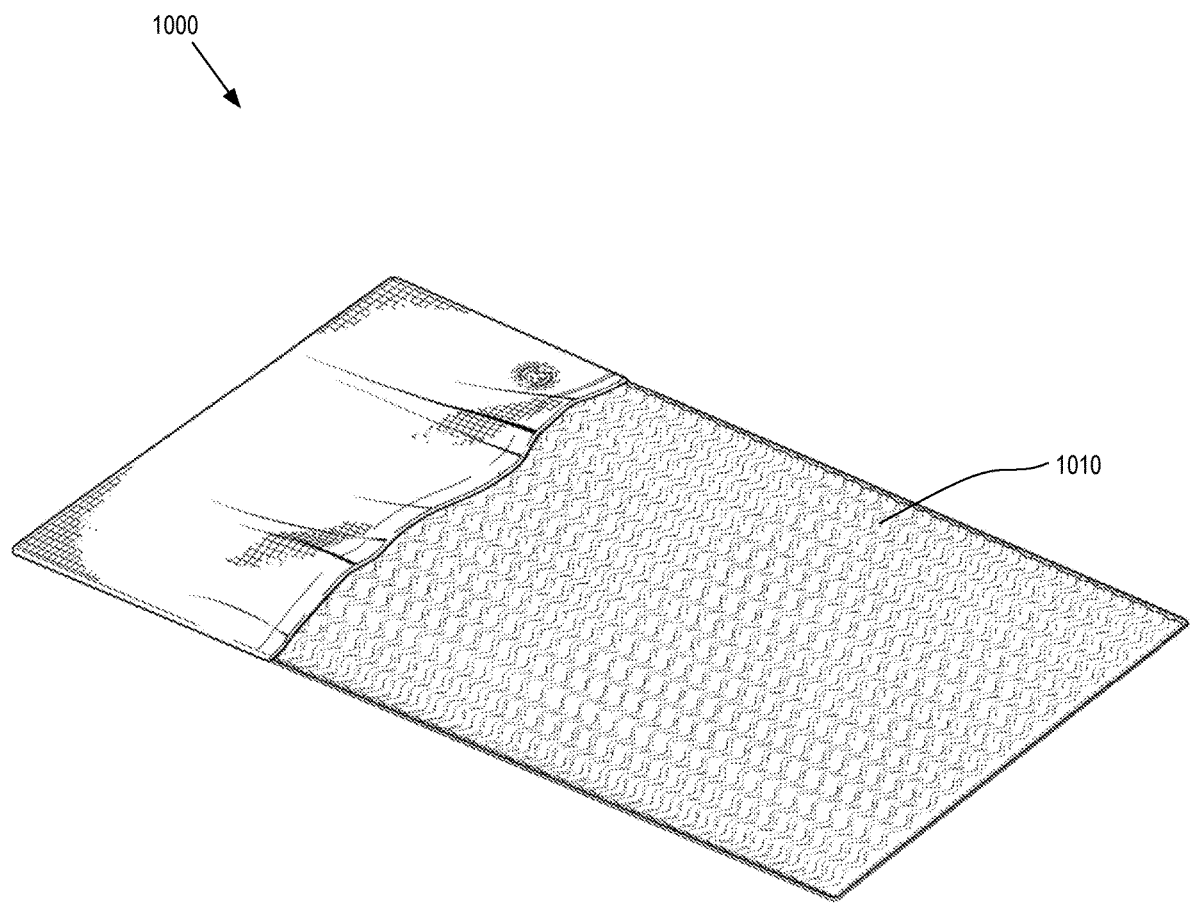
FIG. 10 is a front perspective view of another implementation of the animal bedding illustrating the main section and the pocket, with the pocket covering part of the top layer of the main section and with the top layer of the main section including a wave stitching pattern in dashed lines.
Figure 11:
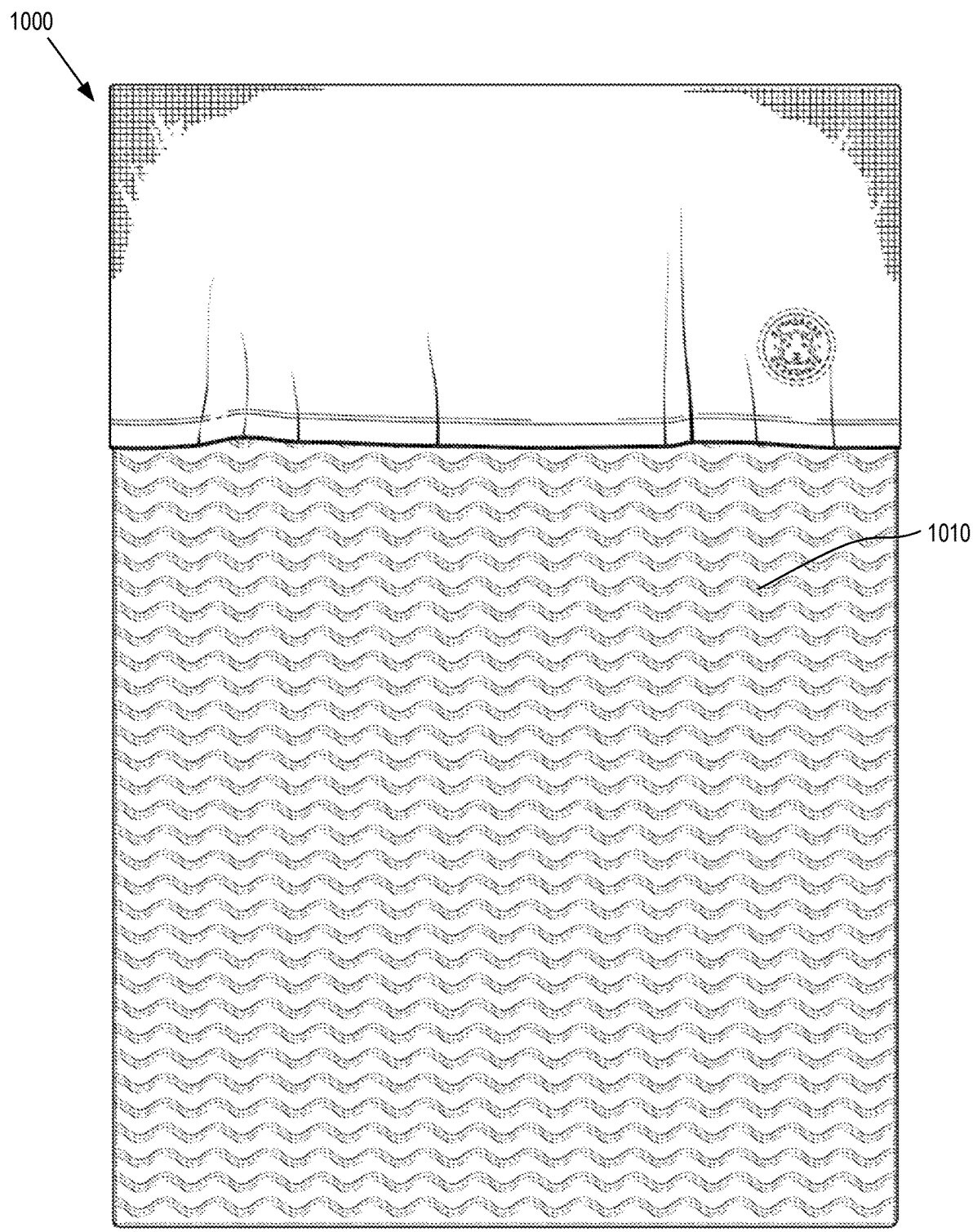
FIG. 11 is a front elevation view of the animal bedding of FIG. 10.
Figure 12:
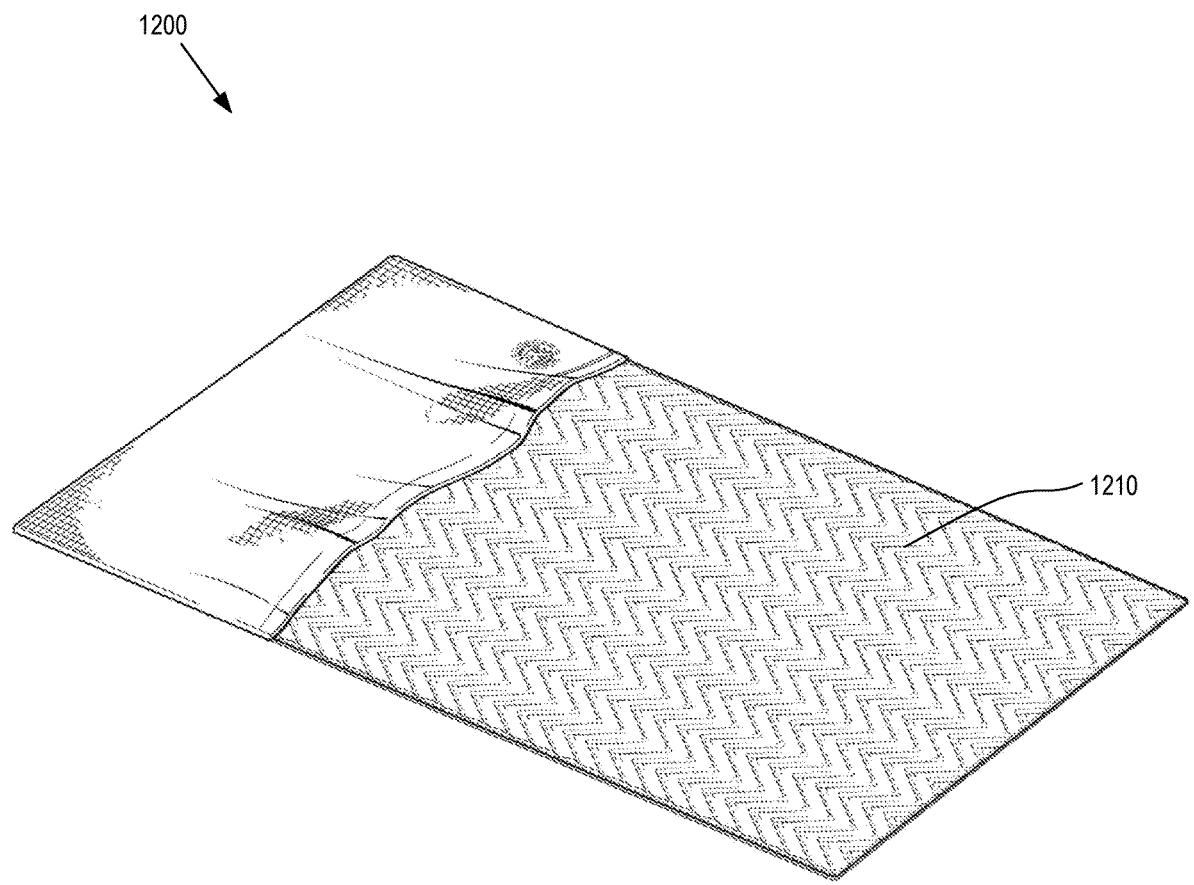
FIG. 12 is a front perspective view of the animal bedding illustrating the main section and the pocket, with the pocket covering part of the top layer of the main section and with the top layer of the main section including a zigzag stitching pattern in dashed lines.
Figure 13:
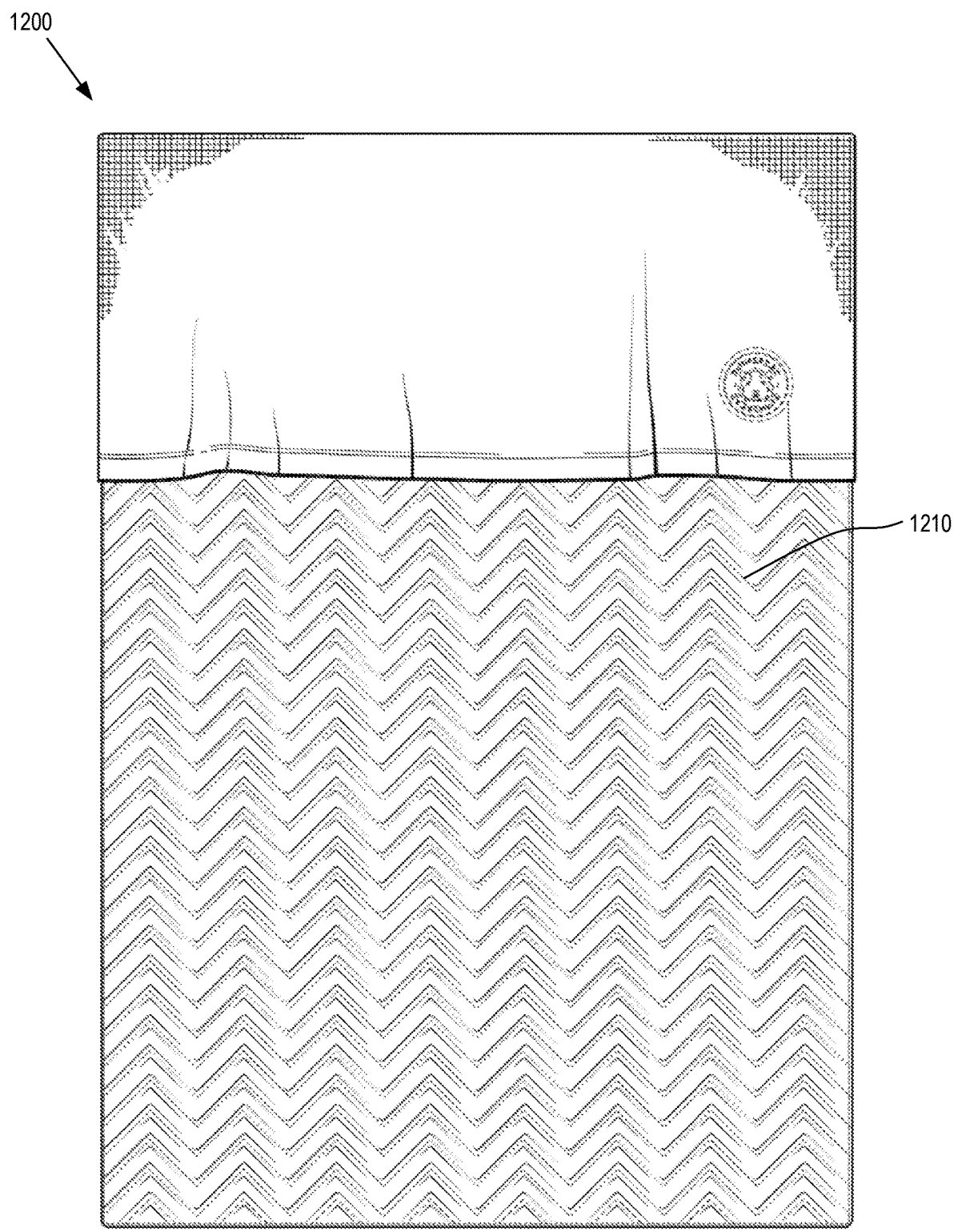
FIG. 13 is a front elevation view of the animal bedding of FIG. 12.

Various patterns of stitching of the top layer 110 and middle layer 130 are contemplated. For example, stitching 120 results in a diamond shaped pattern. As another example, stitching may result in another type of quadrilateral shape pattern, such as a square shaped pattern, as shown in FIG. 2B, which is an alternate front view of the animal bedding comprising the main section 205 with the pocket absent. FIGS. 10-13 illustrate other types of stitching patterns. FIG. 10 is a front perspective view of another implementation of the animal bedding 1000 illustrating the main section and the pocket, with the pocket covering part of the top layer of the main section and with the top layer of the main section including a wave stitching pattern 1010 in dashed lines. FIG. 11 is a front elevation view of the animal bedding 1000 of FIG. 10. FIG. 12 is a front perspective view of the animal bedding 1200 illustrating the main section and the pocket, with the pocket covering part of the top layer of the main section and with the top layer of the main section including a zigzag stitching pattern 1210 in dashed lines. FIG. 13 is a front elevation view of the animal bedding 1200 of FIG. 12.

In particular, stitching 210 connects top layer, middle layer and bottom layer. As shown, stitching 210 is along a periphery of main section 205. Separate from stitching 210, other stitching connects top layer and middle layer. Specifically, vertical stitching 220 and horizontal stitching 230 form a grid of squares (or other type of quadrilateral) that connects top layer and middle layer, but not bottom layer.

Pocket 150 may also be attached to main section 105, such as by stitching along three sides 165, 170, 175 of pocket 150. Fourth side 180 of pocket 150 is not attached to main section 105. In one implementation, pocket 150 is less than half the surface area of main section 105 (e.g., pocket 150 may be ¼ or less than ¼ of the surface area of main section 105). As discussed below, in one implementation, pocket 150 may be attached to all of top layer 110, middle layer 130 and bottom layer 140. Alternatively, pocket 150 may be attached only to top layer 110 but not to middle layer 130 or bottom layer 140.

Figure 3A:
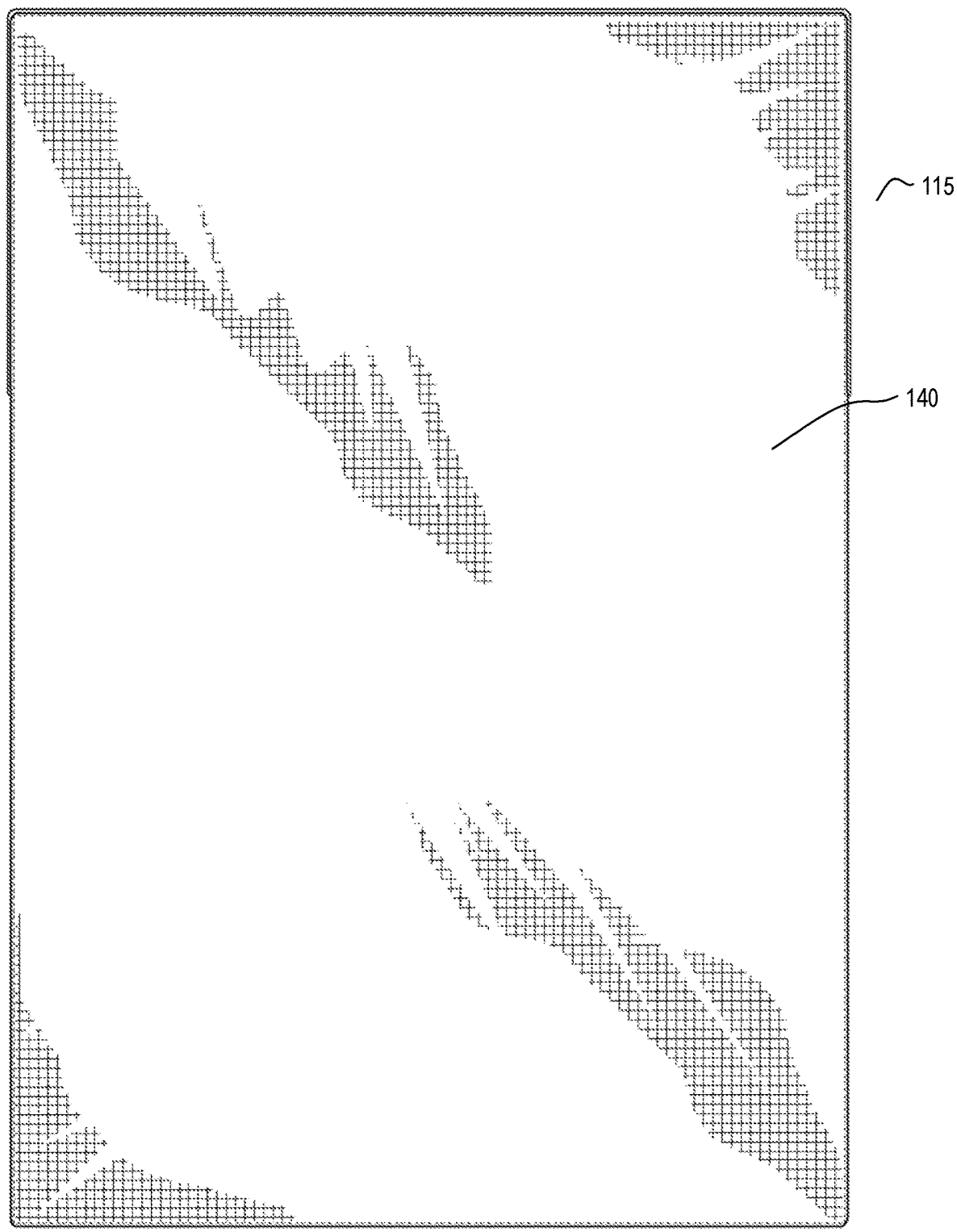
FIG. 3A is a first back view of the animal bedding illustrated in FIG. 1.
Figure 3B:
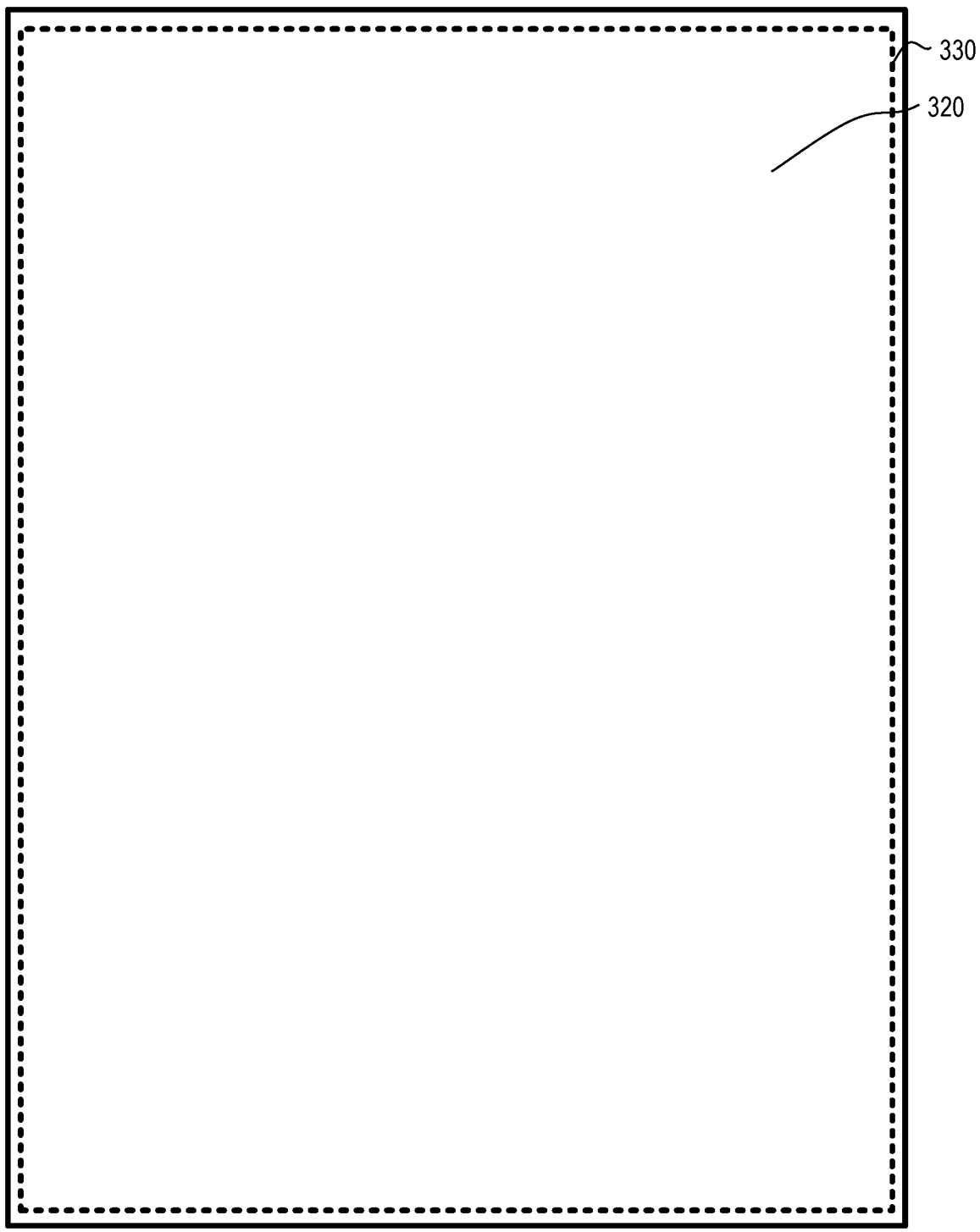
FIG. 3B is a second back view of the animal bedding illustrated in FIG. 1.

FIG. 3A is a first back view of the animal bedding 100 illustrated in FIG. 1. As shown, stitching 115 is along a periphery of the bottom layer 140. Similarly, FIG. 3B is a second back view of the animal bedding 100 illustrated in FIG. 1, with stitching 330 along the periphery of bottom layer 320.

Figure 4:
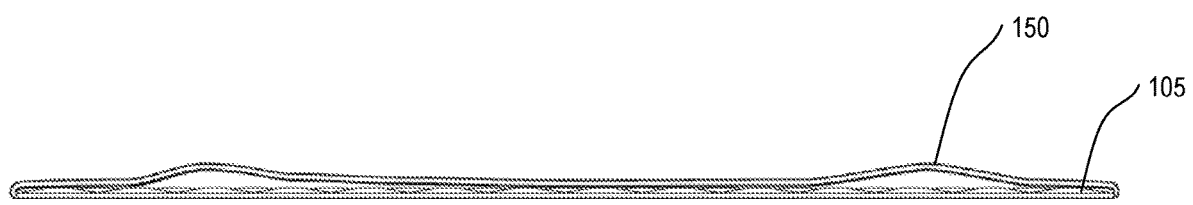
FIG. 4 is a bottom side view (a side view from the perspective of the main section—opposite the side where the pocket is connected to the main section) of the animal bedding illustrated in FIG. 1.
Figure 5:
FIG. 5 is a top side view (a side view from the perspective of where the pocket is connected to the main section) of the animal bedding illustrated in FIG. 1.
Figure 6:
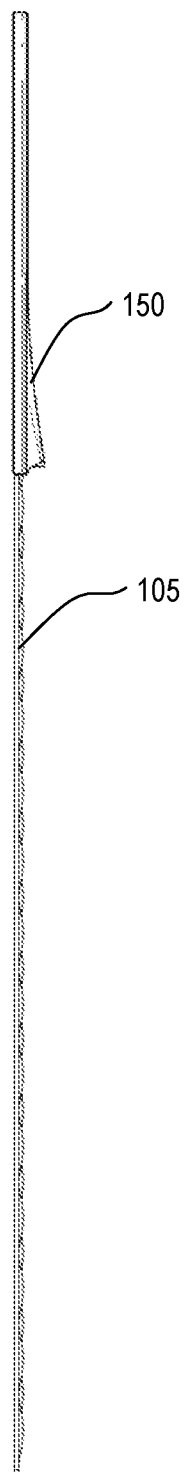
FIG. 6 is a left side view of the animal bedding illustrated in FIG. 1.
Figure 7:
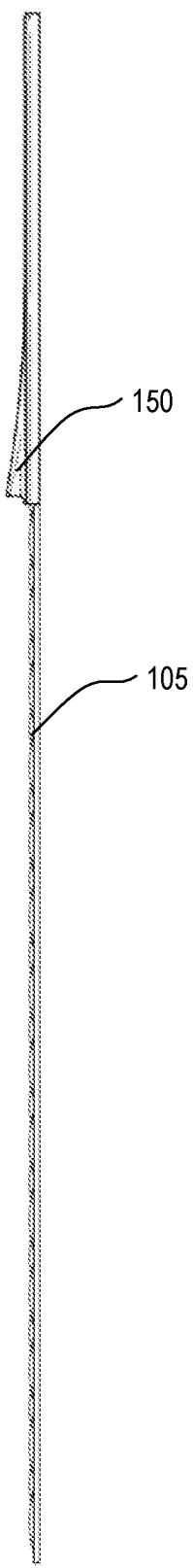
FIG. 7 is a right side view of the animal bedding illustrated in FIG. 1.

FIG. 4 is a top side view of the animal bedding 100 illustrated in FIG. 1, showing pocket 150 and main section 105. Likewise, FIG. 5 is a bottom side view of the animal bedding 100 illustrated in FIG. 1, showing pocket 150 and main section 105. FIG. 6 is a left side view of the animal bedding 100 illustrated in FIG. 1, showing pocket 150 and main section 105. Further, FIG. 7 is a right side view of the animal bedding 100 illustrated in FIG. 1, showing pocket 150 and main section 105.

FIG. 8A is a cross-section at A-A' of FIG. 2A. In particular, FIG. 8A illustrates pocket 150, top layer 110, middle layer 130 and bottom layer 140, with stitching connecting the various parts. For example, pocket 150 may be connected to top layer 110 (and optionally middle layer 130 and bottom layer 140) via stitching. As shown in FIG. 8A, stitching 810 connects pocket 150 to all of top layer 110, middle layer 130, and bottom layer 140. For implementations without pocket 150, stitching 810 attaches top layer 110, middle layer 130, and bottom layer 140 together. Stitching 810 may be along the edge of each of the four sides, such as illustrated by stitching 210 in FIG. 2B. Separate from stitching 810, stitching 820 may connect top layer 110 and middle layer 130. As shown, stitching 820 is a regular pattern in an interior. As discussed above, the pattern may comprise a diamond pattern, a wave pattern, a zig-zag pattern, or the like. Finally, bottom layer 140 includes surfaces 830 and 840. When bottom layer is attached via stitching 810, surface 830 abuts middle layer 130. In a first implementation, surface 830 may be treated with a laminate or other material that makes surface 830 waterproof and/or at least partially water repelling (such as completely water repelling). In a second implementation, surface 840 may be treated with a laminate or other material that makes surface 840 waterproof and/or at least partially water repelling (such as completely water repelling). In a third implementation, surfaces 830 and 840 may be treated with a laminate or other material that makes surfaces 830 and 840 waterproof and/or at least partially water repelling (such as completely water repelling). The thicknesses illustrated in FIG. 8A are merely for illustration purposes only. Example thicknesses are provided below. Further, FIG. 8A includes gaps between pocket 150 and top layer 110, top layer 110 and middle layer 130, and middle layer 130 and bottom layer 140. The gaps between the various layers and the pocket may not be present.

FIG. 8B is a cross-section at B-B' of FIG. 2A. FIG. 8B is similar to FIG. 8A, except for the absence of pocket 150.

The following are examples of the materials, weights, thickness details of various parts of the animal bedding. The examples are merely for illustration purposes. For example, the pocket (or pocket layer) may comprise the following: term of the material: 100% Polyester; weight: 250 gsm; thickness: 0.7 mm. The top layer may comprise the following: term of the material: 100% Polyester; weight: 180 gsm; thickness: 0.48 mm. In the example of the middle layer being composed of a bamboo absorbent layer: term of the material: Bamboo fiber batting; weight: 400 gsm; thickness: 1 cm; blend: Bamboo fiber 70%, polyester 30%. As discussed above, various percent bamboo blends are contemplated. As another example, the waterproof bottom layer may comprise the following: term of the material: 100% Polyester; total weight: 130 gsm; overall thickness (including material and laminate): 0.44 mm; laminate weight: 40 gsm; laminate thickness: 0.02 mm; non-laminate material thickness: 0.42 mm; non-laminate material weight: 90 gsm.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

The invention claimed is:

1. Animal bedding comprising:
   a main section comprising:
   a top layer;
   a middle layer comprising a hydrophilic material; and
   a bottom layer, wherein at least a part of the bottom layer is hydrophobic;
   wherein the top layer is attached to the bottom layer; and
   wherein the top layer is attached to the middle layer;
   a pocket, wherein the pocket is attached to the main section, the pocket covering less than half of a surface area of the top layer.

2. The animal bedding of claim 1, wherein the top layer comprises a hydrophobic material.

3. The animal bedding of claim 2, wherein the top layer and the bottom layer are attached via a first set of stitching;
   wherein the top layer and the middle layer are attached via a second set of stitching; and
   wherein the first set of stitching is separate from the second set of stitching.

4. The animal bedding of claim 3, wherein the first set of stitching attaches the top layer, the middle layer and the bottom layer; and wherein the second set of stitching separate from the first set of stitching attaches the top layer to the middle layer, but not the top layer or the middle layer to the bottom layer.

5. The animal bedding of claim 4, wherein the first set of stitching comprises stitching of the top layer, middle layer, and bottom layer together along a perimeter of the main section; and wherein the second set of stitching comprises stitching the top layer and middle layer together in an interior of the main section without stitching to the bottom layer.

6. The animal bedding of claim 5, wherein the second set of stitching of the top layer and the middle layer together results in quilting of a surface of the top layer attached to the pocket.

7. The animal bedding of claim 6, wherein the quilting of the surface of the top layer is a predetermined quadrilateral pattern.

8. The animal bedding of claim 6, wherein at least one surface of the bottom layer is hydrophobic.

9. The animal bedding of claim 8, wherein a surface of the bottom layer in contact with the middle layer is hydrophobic.

10. The animal bedding of claim 6, wherein the surface of the bottom layer in contact with the middle layer is treated with a substance that repels water.

11. The animal bedding of claim 10, wherein the substance comprises a polyurethane laminate.

12. The animal bedding of claim 10, wherein the middle layer comprises bamboo.

13. The animal bedding of claim 12, wherein the middle layer consists of a bamboo blend of bamboo and a synthetic material.

14. The animal bedding of claim 12, wherein the top layer is composed of a predetermined hydrophobic material; and wherein the pocket is composed of the same predetermined hydrophobic material.

15. The animal bedding of claim 14, wherein the pocket is made of two layers of the predetermined hydrophobic material; and wherein the top layer is made of one layer of the predetermined hydrophobic material;

wherein the pocket is attached on three sides to the top layer of the main section, the pocket covering less than half of a surface area of the top layer.

16. The animal bedding of claim 1, wherein the pocket covering less than one quarter of the surface area of the top layer.

17. The animal bedding of claim 1, wherein the pocket is attached to the top layer, the middle layer, and the bottom layer of the main section.

18. The animal bedding of claim 17, wherein first stitching attaches the top layer, the middle layer, and the bottom layer together to form the main section; and wherein second stitching attaches the pocket to the main section.

19. Animal bedding comprising:
a main section comprising:
 a top layer;
 a middle layer comprising a hydrophilic material; and
 a bottom layer;
 wherein a first set of stitching attaches the top layer, the middle layer and the bottom layer together; and
 wherein a second set of stitching separate from the first set of stitching attaches the top layer to the middle layer but not to the bottom layer;
a pocket, wherein the pocket is attached on three sides to the top layer of the main section.

20. The animal bedding of claim 19, wherein the pocket and the top layer are fleece; and wherein a surface of the bottom layer in contact with the middle layer is hydrophobic.

* * * * *